United States Patent Office 2,811,897
Patented Nov. 5, 1957

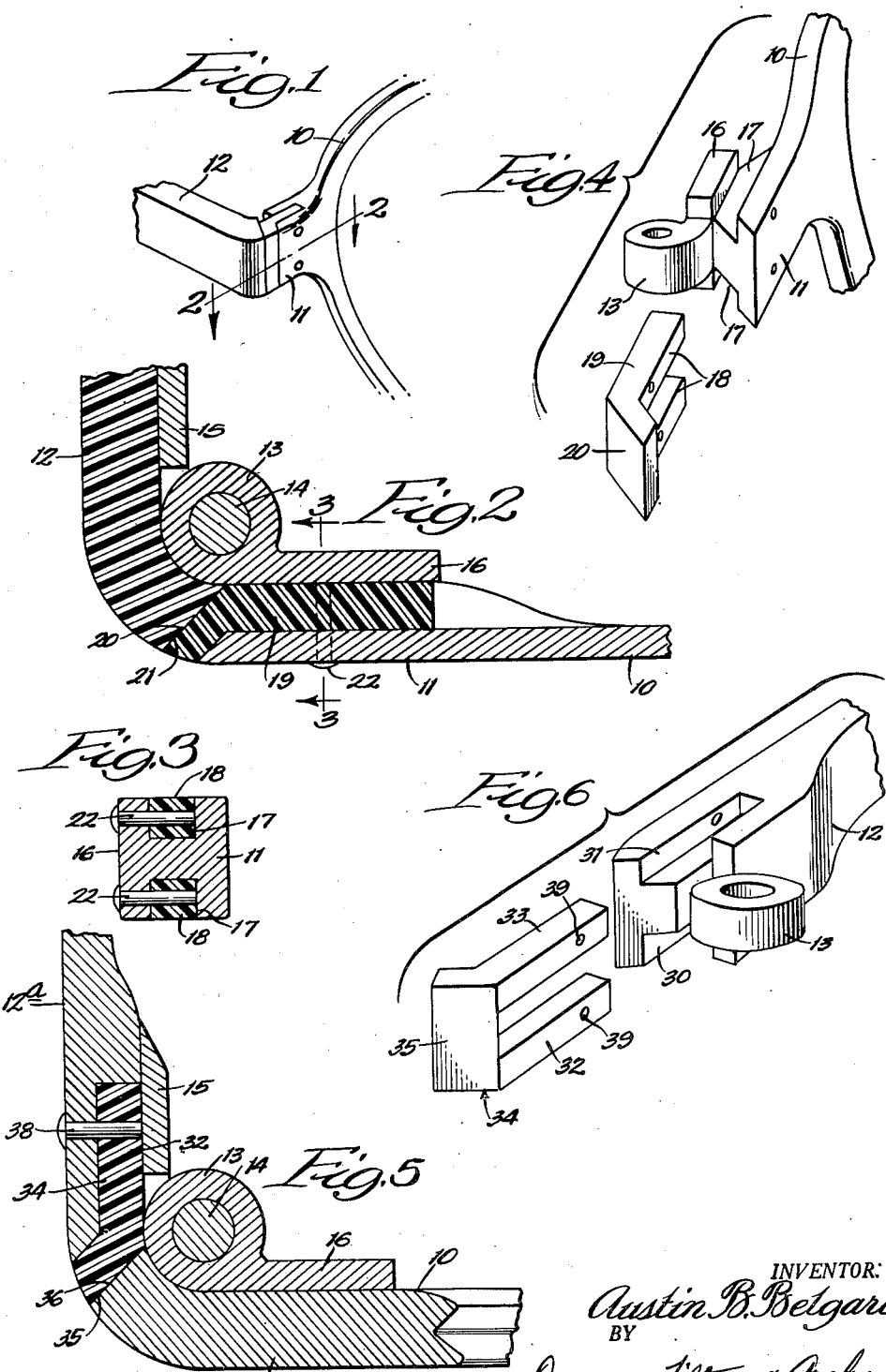

2,811,897

PLASTIC HINGE INSERT FOR SPECTACLE FRAME

Austin B. Belgard, Evanston, Ill.

Application November 12, 1953, Serial No. 391,550

2 Claims. (Cl. 88—53)

The present invention relates to a plastic hinge insert for a spectacle frame.

Spectacle frames have been heretofore produced and equipped at their endpieces with hinges to which temples are secured. When the frame is being fitted to a person with a relatively wide face, it is necessary to file away a part of the metal frame portion to allow the temples to swing outwardly, but such filing cuts through the gold or surface metal and into the base metal, where corrosion will now occur. Further, if slightly too much of the metal is filed away, this cannot be replaced and the spectacle frame remains permanently too loose. The problem has extended over a long period of time and no solution has been presented which would permit ready and accurate adjustments to be made without cutting into any metal part.

An object of the present invention is to provide a structure which permits filing so as to secure an accurate adjustment without weakening the hinge or cutting into any metal part. A further object is to provide a plastic insert which may be interlocked with the hinge-supporting structure and providing a plastic face which may be readily modified to produce the exact adjustment of the temples to the face of the wearer in a modicum of time. Other specific objects and advantages will appear as the specification proceeds.

The invention is shown in an illustrative embodiment by the accompanying drawing, in which—

Figure 1 is a broken, perspective view of an eyeglass frame and temple connected in a manner utilizing my invention; Fig. 2, an enlarged sectional view of the structure shown in Fig. 1, the section being taken as indicated at line 2—2 of Fig. 1; Fig. 3, a transverse sectional view, the section being taken as indicated at line 3—3 of Fig. 2; Fig. 4, a perspective view of the hinge and connecting parts shown in spaced-apart relation; Fig. 5, a view similar to Fig. 2 but showing a modified form of the invention; and Fig. 6, a perspective view of the parts shown in Fig. 5, the parts thereof being in spaced-apart relation.

In the illustration given in Figs. 1 to 4, inclusive, 10 designates an eyeglass frame equipped with an endpiece 11. Connected to the endpiece 11 is a temple 12. A hinge 13 is provided with the usual pivot pin 14 and leaf 15 is connected to the temple 12, while leaf 16 is connected to the endpiece 11 of the frame 10.

As shown more clearly in Fig. 4, I provide the endpiece 11 of the frame with cut-away portions or slots 17 adapted to receive the spaced legs 18 of a plastic insert member 19. The plastic insert member 19 is provided at its outer side with an inclined flange or face 20 adapted to abut the inclined face 21 of the temple 12. The insert has a generally L-shaped configuration and it provides a relatively thick flange having the outer face 20 which may be filed away to increase the outward movement of the temple 12 when this is desired. I prefer to secure the legs 18 tightly in the recess 17 of the endpiece 11 by pins 22, as shown more clearly in Fig. 3. It will be understood, however, that any suitable means for anchoring the plastic insert upon the endpiece 11 may be employed.

In the operation of the foregoing structure, the frame may be formed as illustrated with the plastic insert 19 secured by the metal or other frame and temple members. The play between the temple end 21 and the insert-equipped endpiece 11 of the frame may then be controlled accurately by filing away the face 20 of the plastic insert 19. In the event that too much plastic is removed in the trial work, a shim of plastic may be readily bonded to the plastic body 19 along the face 20 to increase the thickness thereof.

The insert is relatively small and is hardly visible in the metal frame, but it permits accurate and ready adjustment of the temples with a minimum of effort while producing great accuracy in the limited swinging movement desired for the temples.

The plastic insert 19 may be formed of cellulose nitrate or of any of the well-known plastic materials employed in the manufacture of plastic frames.

In the structure shown in Figs. 5 and 6, the plastic insert, instead of being attached to the endpiece of the frame, is attached to the temple 12a. The temple 12a is provided near its forward end with the slots 30 and 31, and such slots receive the legs 32 and 33 of the plastic piece 34. The plastic insert 34 is provided at its outer side with an inclined flange or face 35 adapted to abut the inclined face 36 of the endpiece 37 of frame 10. The temple and the endpiece are secured together by the hinge structure 14 which connects the hinge leaves 16 and 15. Pins 38 extend through the openings 39 in the legs 32 and 33 and through aligned openings in the temple 12a so as to anchor the plastic insert 34 firmly within the temple 12a.

By filing away the face 35 of the plastic insert 34, it is possible to accurately control the play between the temple end 12a and the frame endpiece 37.

While, in the foregoing specification, I have set forth a specific structure in considerable detail for the purpose of illustrating the invention, it will be understood that such details of structure may be varied widely by those skilled in the art without departing from the spirit of my invention.

I claim:

1. In a metal spectacle frame having a metal endpiece member, a metal temple member, and a metal hinge connecting said members, one of said members having spaced slotways therein, and a hard plastic insert having spaced legs adapted to slidably engage said slotways of said member and to be secured therein, said insert having its legs merged into a thickened flange providing an inclined face engageable with the other of said members and adapted to be filed away to increase the play between the members.

2. In a metal spectacle frame having a plated metal endpiece member and a plated metal temple member connected by a metal hinge, one of said members having spaced slotways therein, and a hard plastic insert having spaced legs adapted to slidably engage said slotways of said member, said insert having its legs merged into a thickened flange providing an inclined face engageable with the other of said members and adapted to be filed away to increase the play between the members, and pins extending through the slotway-equipped member and said insert to lock the same within said slotways.

References Cited in the file of this patent

UNITED STATES PATENTS

| 2,145,307 | Hunt | Jan. 31, 1939 |
| 2,490,868 | Hansen | Dec. 13, 1949 |
| 2,529,879 | Levoy | Nov. 14, 1950 |
| 2,587,870 | Marsters | Mar. 4, 1952 |
| 2,684,014 | Fairly | July 20, 1954 |
| 2,703,036 | Splaine | Mar. 1, 1955 |
| 2,727,436 | Prince | Dec. 20, 1955 |

FOREIGN PATENTS

| 277,372 | Switzerland | Dec. 1, 1951 |
| 670,137 | Great Britain | Apr. 16, 1952 |